United States Patent
Lu et al.

(10) Patent No.: US 12,339,199 B2
(45) Date of Patent: Jun. 24, 2025

(54) TBM TUNNELING TEST BENCH FOR MICROWAVE-ASSISTED ROTARY ROCK BREAKING

(71) Applicants: STATE KEY LABORATORY OF SHIELD MACHINE AND BORING TECHNOLOGY, Henan (CN); CHINA RAILWAY TUNNEL GROUP CO., LTD., Guangdong (CN)

(72) Inventors: Gaoming Lu, Henan (CN); Kairong Hong, Henan (CN); Chuigang Zeng, Henan (CN); Jianjun Zhou, Henan (CN); Yandong Yang, Henan (CN); Limeng Zhang, Henan (CN)

(73) Assignees: STATE KEY LABORATORY OF SHIELD MACHINE AND BORING TECHNOLOGY, Zhengzhou (CN); CHINA RAILWAY TUNNEL GROUP CO., LTD., Guangzhou (CN)

(*) Notice: Subject to any disclaimer, the term of this patent is extended or adjusted under 35 U.S.C. 154(b) by 620 days.

(21) Appl. No.: 17/781,235

(22) PCT Filed: Jun. 10, 2021

(86) PCT No.: PCT/CN2021/099269
§ 371 (c)(1),
(2) Date: May 31, 2022

(87) PCT Pub. No.: WO2022/236907
PCT Pub. Date: Nov. 17, 2022

(65) Prior Publication Data
US 2023/0194386 A1    Jun. 22, 2023

(30) Foreign Application Priority Data
May 13, 2021 (CN) .......................... 202110520250.8

(51) Int. Cl.
*G01M 99/00* (2011.01)
*E21D 9/10* (2006.01)
*E21D 9/11* (2006.01)

(52) U.S. Cl.
CPC ......... *G01M 99/005* (2013.01); *E21D 9/1073* (2013.01); *E21D 9/11* (2013.01)

(58) Field of Classification Search
CPC ...... G01M 99/005; E21D 9/1073; E21D 9/11; E21C 37/16
See application file for complete search history.

(56) References Cited

U.S. PATENT DOCUMENTS

2009/0321132 A1* 12/2009 Ouellet ..................... E21B 7/15
175/11

FOREIGN PATENT DOCUMENTS

CN    102788693 A * 11/2012

OTHER PUBLICATIONS

CN102788693 English translation (Year: 2012).*

* cited by examiner

*Primary Examiner* — Xin Y Zhong
(74) *Attorney, Agent, or Firm* — MUNCY, GEISSLER, OLDS & LOWE, P.C.

(57) ABSTRACT

Provided is a TBM tunneling test bench for microwave-assisted rotary rock breaking including a tunneling test bench body and a microwave-assisted rock breaking system, wherein the tunneling test bench body includes a base, a turnover bracket, a movable bracket, turnover oil cylinders, a pushing oil cylinder and a cutter head; the turnover bracket is hinged to the base; the turnover oil cylinders are connected between the base and the turnover bracket; the movable bracket coaxially sleeves the turnover bracket; the pushing oil cylinder is connected between the turnover bracket and the movable bracket; the cutter head is coaxially (Continued)

located in the movable bracket, and rotates freely; cutter head rotation driving motors are mounted in the movable bracket; the microwave-assisted rock breaking system is mounted between the movable bracket and the cutter head; and a rock sample bearing and placing box is arranged on the turnover bracket on an opposite side of the cutter head.

2 Claims, 5 Drawing Sheets

TBM TUNNELING TEST BENCH FOR MICROWAVE-ASSISTED ROTARY ROCK BREAKING

BACKGROUND OF THE INVENTION

1. Field of the Invention

The invention relates to the technical fields of rock masses and tunnel engineering, and particularly relates to a TBM tunneling test bench for microwave-assisted rotary rock breaking.

2. The Prior Arts

A TBM (full-section hard rock tunnel boring machine) has been widely used in railways, hydropower, highways, subways and other tunnel projects that need to pass through rock formations, and a cutter head cutting tool rock breaking technology is the core of a TBM technology. In order to master a hobbing cutter rock breaking technology, it is necessary to use a TBM tunneling comprehensive test bench to accurately simulate the rock breaking process of hobbing cutters in the laboratory.

The TBM tunneling comprehensive test bench can perform TBM tunneling simulation tests on different types of rocks or similar materials, and can perform multi-hobbing-cutter rock breaking tests on different tools, tool spacing, cutting speed, penetration, and the like, to study change of rock breaking efficiency and tool life caused by different tool parameters, and configure tools of different materials for corresponding projects to meet requirements of actual construction.

However, when the TBM encounters hard rock and extremely hard rock tunnels, the hobbing cutters of the TBM are severely worn, which will cause an increase in maintenance rate and construction cost, and is likely to cause delays in the construction period, and even enable the TBM to be unable to tunnel in severe cases. At present, many research institutions are exploring novel auxiliary rock breaking technologies to solve the problem of severe tool wear when the TBM hobbing cutters cut the hard rocks. Microwave-assisted rock breaking is a novel auxiliary rock breaking technology with great potential. However, the existing TBM tunneling comprehensive test bench has not considered a combination with the microwave-assisted rock breaking technology during R&D and design, thereby limiting the research capability of the TBM tunneling comprehensive test bench.

SUMMARY OF THE INVENTION

In view of the problems existing in the prior art, the invention provides a TBM tunneling test bench for microwave-assisted rotary rock breaking, which can be switched between a vertical rock breaking simulation state and a horizontal rock breaking simulation state, and can perform the TBM tunneling simulation test under the microwave-assisted rotary rock breaking conditions and the multi-hobbing-cutter rock breaking test under the action of microwaves so as to provide a feasible scheme for studying influence of different action parameters on the microwave rock breaking efficiency and tool life.

In order to realize the above objective, a TBM tunneling test bench for microwave-assisted rotary rock breaking according to the present invention comprises a tunneling test bench body and a microwave-assisted rock breaking system, wherein the tunneling test bench body comprises a base, a turnover bracket, a movable bracket, turnover oil cylinders, a pushing oil cylinder and a cutter head; the base is fixedly arranged on a ground, and the turnover bracket is hinged to the base, and is freely rotatable around a hinge shaft; the turnover oil cylinders are connected between the base and the turnover bracket, cylinder barrel ends of the turnover oil cylinders are hinged to the base, and piston rod ends of the turnover oil cylinders are hinged to the turnover bracket; the movable bracket coaxially sleeves the turnover bracket, and the movable bracket has an axial movement degree of freedom relative to the turnover bracket; the pushing oil cylinder is connected between the turnover bracket and the movable bracket, a cylinder barrel end of the pushing oil cylinder is hinged to the turnover bracket, and a piston rod end of the pushing oil cylinder is hinged to the movable bracket; the cutter head is located in the movable bracket, the cutter head and the movable bracket are coaxially arranged, the cutter head is connected with the movable bracket through bearings, and the cutter head has a rotation degree of freedom relative to the movable bracket; cutter head rotation driving motors are mounted in the movable bracket, and motor shafts of the cutter head rotation driving motors and the cutter head are in power transmission through gears; the microwave-assisted rock breaking system is mounted between the movable bracket and the cutter head; and a rock sample bearing and placing box is arranged on the turnover bracket on an opposite side of the cutter head, a rock sample is fixedly mounted in the rock sample bearing and placing box, and each hobbing cutter of the cutter head is right opposite to a surface of the rock sample.

The microwave-assisted rock breaking system comprises a microwave generator, an isolator, a tuner, a first transmission waveguide, a rotating waveguide, a power divider, two flexible waveguides, two second transmission waveguides and two microwave heaters; the rotating waveguide is mounted at a center of the cutter head, a microwave output end and a microwave input end of the rotating waveguide adopt a coaxial sleeving structure, the microwave output end of the rotating waveguide has a rotating degree of freedom relative to the microwave input end, and the microwave output end of the rotating waveguide is fixedly connected with the cutter head; the microwave generator is fixedly mounted on the movable bracket, a microwave output end of the microwave generator and the microwave input end of the rotating waveguide are connected sequentially through the isolator, the tuner and the first transmission waveguide; the isolator is used for absorbing microwave energy which is not absorbed by the rock sample and reflected backwards; the tuner is used for automatically matching and adjusting impedance, so that microwave energy generated by the microwave generator is sufficiently absorbed by the rock sample; and a microwave input end of the power divider is connected with the microwave output end of the rotating waveguide, a microwave output end of the power divider is divided into two paths for output, each path is connected with one flexible waveguide, one microwave heater is connected to the microwave output end of each flexible waveguide, and a microwave output end of each microwave heater is right opposite to the surface of the rock sample.

Following support mechanisms are arranged between the second transmission waveguides and the cutter head, and each following support mechanism comprises a guide rail, a sliding block, a support rod and a roller; each guide rail is fixedly mounted on the cutter header, each sliding block is arranged on the corresponding guide rail, each sliding block has a linear movement degree of freedom relative to the corresponding guide rail, and a restoring spring is arranged between each sliding block and the corresponding guide rail; each sliding block is fixedly connected with the corresponding second transmission waveguide; and one end of each support rod is fixedly connected to the corresponding sliding block, each roller is mounted at another end of the corresponding support rod, and each roller is in contact cooperation with the surface of the rock sample.

The TBM tunneling test bench for microwave-assisted rotary rock breaking has the following beneficial effects:

The TBM tunneling test bench for microwave-assisted rotary rock breaking can be switched between a vertical rock breaking simulation state and a horizontal rock breaking simulation state, and can perform the TBM tunneling simulation test under the microwave-assisted rotary rock breaking conditions and the multi-hobbing-cutter rock breaking test under the action of microwaves so as to provide a feasible scheme for studying influence of different action parameters on the microwave rock breaking efficiency and tool life.

Figure 1:
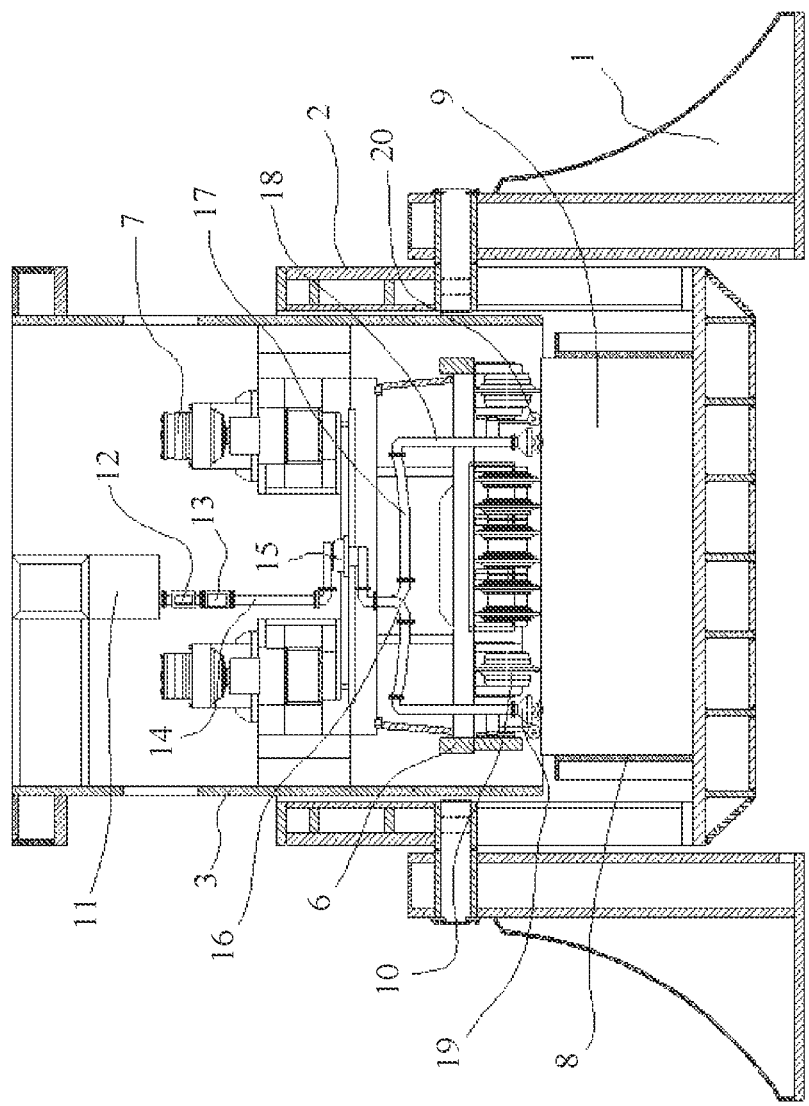
FIG. 1 is a schematic structural diagram of a TBM tunneling test bench (in a vertical rock breaking simulation state) for microwave-assisted rotary rock breaking of the invention.

In the drawings, 1: base, 2: turnover bracket, 3: movable bracket, 4: turnover oil cylinder, 5: pushing oil cylinder, 6: cutter head, 7: cutter head rotation driving motor, 8: rock sample bearing and placing box, 9: rock sample, 10: hobbing cutter, 11: microwave generator, 12: isolator, 13: tuner, 14: first transmission waveguide, 15: rotating waveguide, 16: power divider, 17: flexible waveguide, 18: second transmission waveguide, 19: microwave heater, 20: following support mechanism, 21: guide rail, 22: sliding block, 23: support rod, and 24: roller.

DETAILED DESCRIPTION OF THE PREFERRED EMBODIMENT

The invention will be further described in detail below with reference to the accompanying drawings and specific embodiments.

Figure 2:
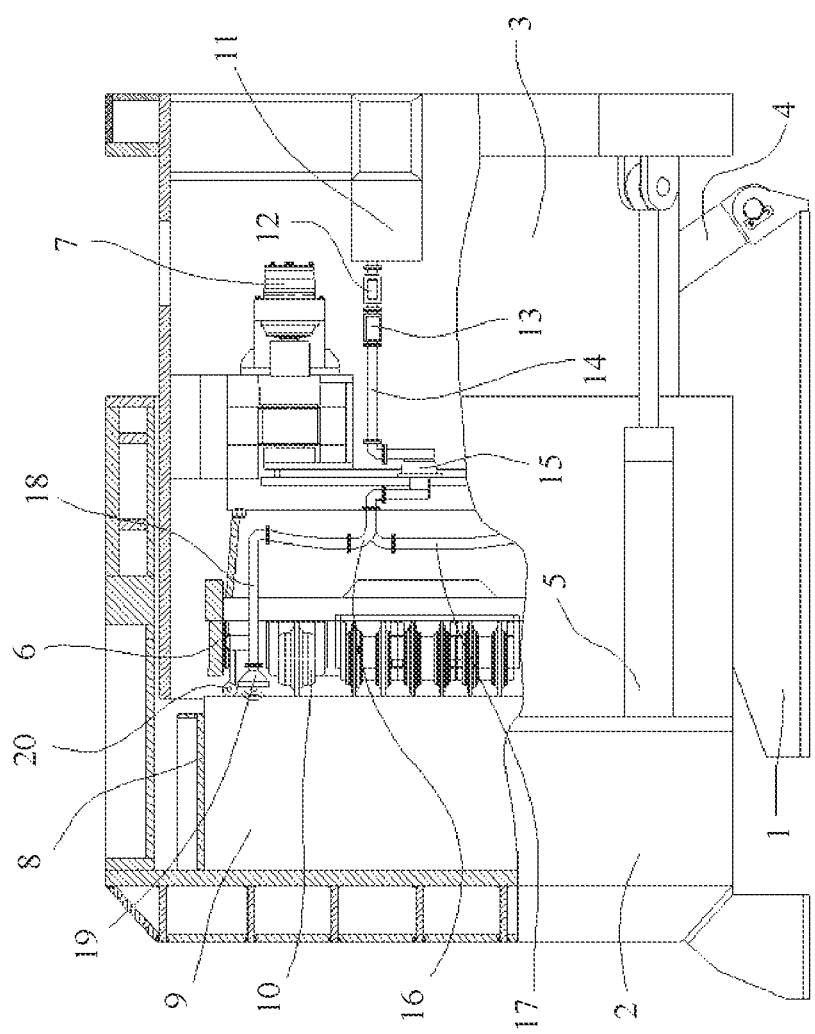
FIG. 2 is a schematic structural diagram of the TBM tunneling test bench (in a horizontal rock breaking simulation state) for microwave-assisted rotary rock breaking of the invention.
Figure 3:
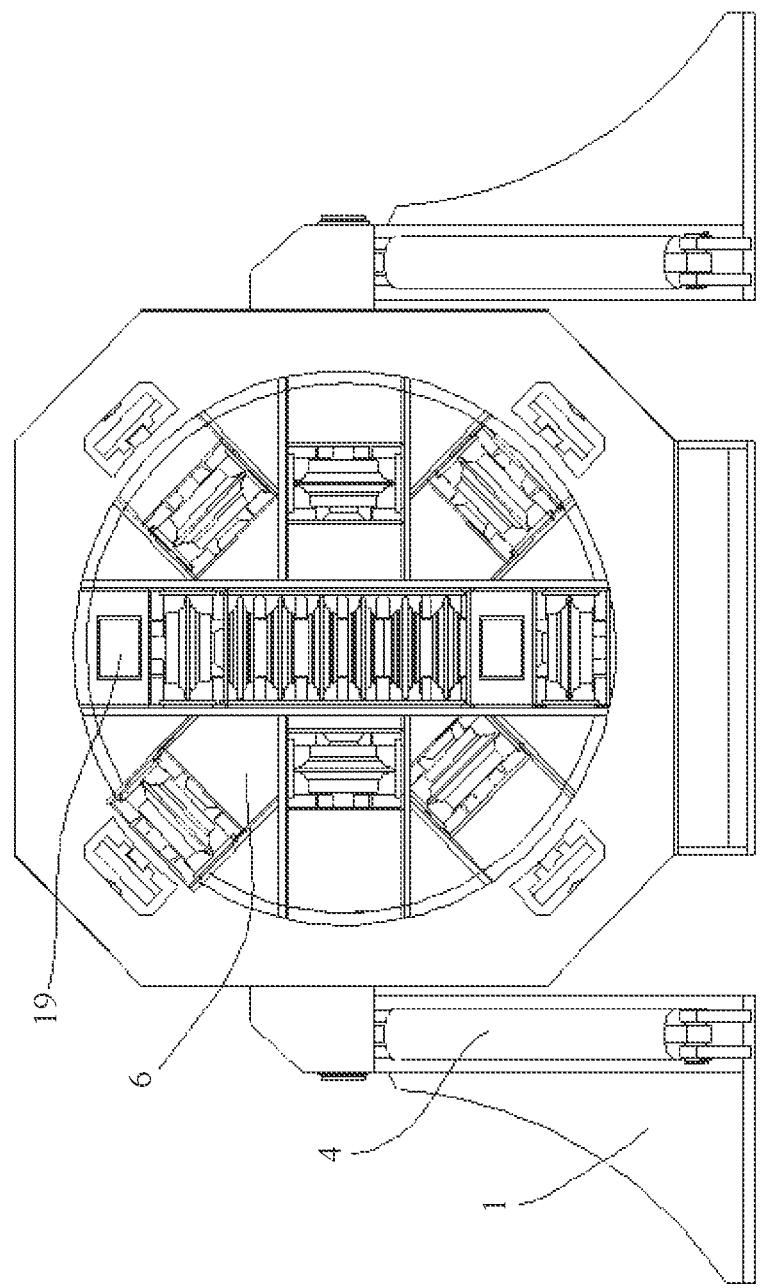
FIG. 3 is a schematic structural diagram of the TBM tunneling test bench (a front view of the cutter head) for microwave-assisted rotary rock breaking of the invention.
Figure 4:
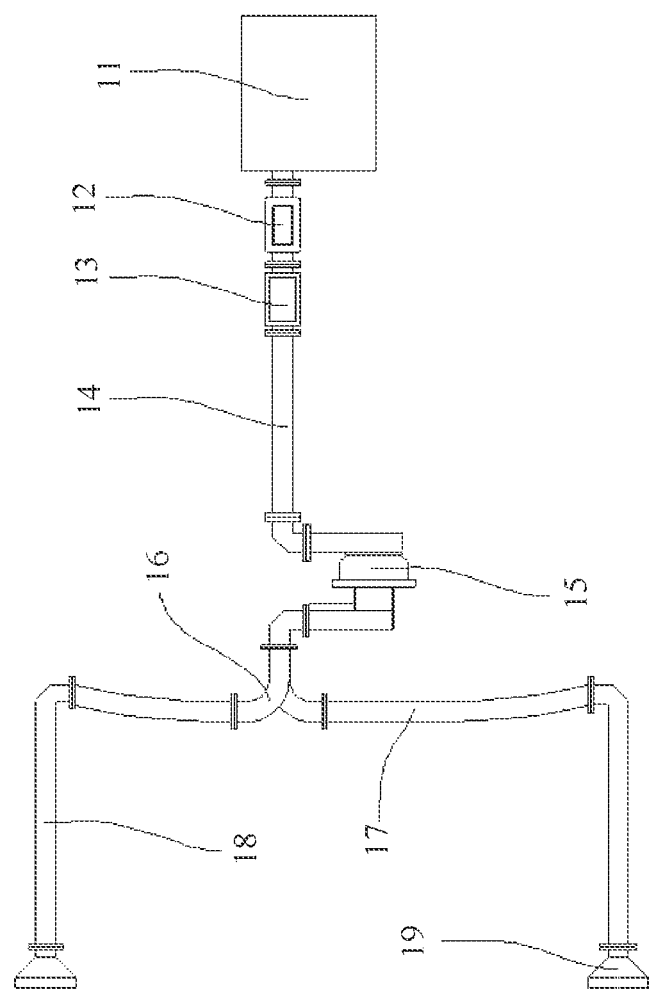
FIG. 4 is a schematic structural diagram of a microwave-assisted rock breaking system.
Figure 5:
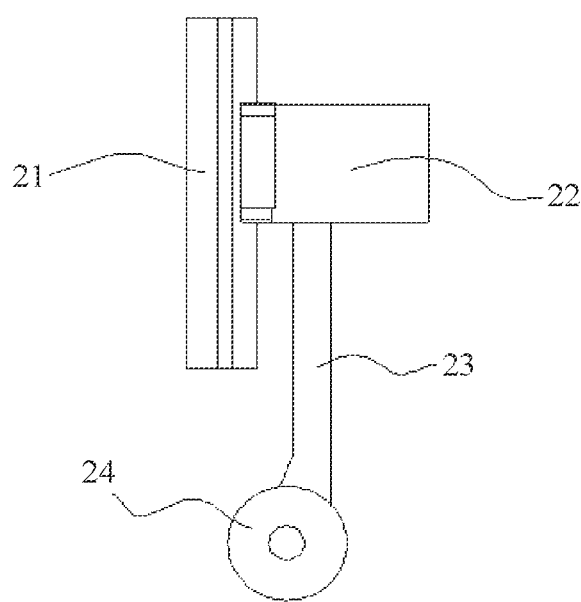
FIG. 5 is a schematic structural diagram of a following support mechanism.

As shown in FIGS. 1-5, a TBM tunneling test bench for microwave-assisted rotary rock breaking comprises a tunneling test bench body and a microwave-assisted rock breaking system, wherein the tunneling test bench body comprises a base 1, a turnover bracket 2, a movable bracket 3, turnover oil cylinders 4, a pushing oil cylinder 5 and a cutter head 6; the base 1 is fixedly arranged on a ground, and the turnover bracket 2 is hinged to the base 1, and is freely rotatable around a hinge shaft; the turnover oil cylinders 4 are connected between the base 1 and the turnover oil cylinders 2, cylinder barrel ends of the turnover oil cylinders 4 are hinged to the base 1, and piston rod ends of the turnover oil cylinders 4 are hinged to the turnover bracket 2; the movable bracket 3 coaxially sleeves the turnover bracket 2, and the movable bracket 3 has an axial movement degree of freedom relative to the turnover bracket 2; the pushing oil cylinder 5 is connected between the turnover bracket 2 and the movable bracket 3, a cylinder barrel end of the pushing oil cylinder 5 is hinged to the turnover bracket 2, and a piston rod end of the pushing oil cylinder 5 is hinged to the movable bracket 3; the cutter head 6 is located in the movable bracket 3, the cutter head 6 and the movable bracket 3 are coaxially arranged, the cutter head 6 is connected with the movable bracket 3 through bearings, and the cutter head 6 has a rotation degree of freedom relative to the movable bracket 3; cutter head rotation driving motors 7 are mounted in the movable bracket 3, and motor shafts of the cutter head rotation driving motors 7 and the cutter head 6 are in power transmission through gears; the microwave-assisted rock breaking system is mounted between the movable bracket 3 and the cutter head 6; and a rock sample bearing and placing box 8 is arranged on the turnover bracket 2 on an opposite side of the cutter head 6, a rock sample 9 is fixedly mounted in the rock sample bearing and placing box 8, and each hobbing cutter 10 of the cutter head 6 is right opposite to a surface of the rock sample 9.

The microwave-assisted rock breaking system comprises a microwave generator 11, an isolator 12, a tuner 13, a first transmission waveguide 14, a rotating waveguide 15, a power divider 16, two flexible waveguides 17, two second transmission waveguides 18 and two microwave heaters 19; the rotating waveguide 15 is mounted at a center of the cutter head 6, a microwave output end and a microwave input end of the rotating waveguide 15 adopt a coaxial sleeving structure, the microwave output end of the rotating waveguide 15 has a rotating degree of freedom relative to the microwave input end, and the microwave output end of the rotating waveguide 15 is fixedly connected with the cutter head 6; the microwave generator 11 is fixedly mounted on the movable bracket 3, a microwave output end of the microwave generator 11 and the microwave input end of the rotating waveguide 15 are connected sequentially through the isolator 12, the tuner 13 and the first transmission waveguide 14; the isolator 12 is used for absorbing microwave energy which is not absorbed by the rock sample 9 and reflected backwards; the tuner 13 is used for automatically matching and adjusting impedance, so that microwave energy generated by the microwave generator 11 is sufficiently absorbed by the rock sample 9; and a microwave input end of the power divider 16 is connected with the microwave output end of the rotating waveguide 15, a microwave output end of the power divider 16 is divided into two paths for output, each path is connected with one flexible waveguide 17, one microwave heater 19 is connected to the microwave output end of each flexible waveguide 17, and a microwave output end of each microwave heater 19 is right opposite to the surface of the rock sample 9.

Following support mechanisms 20 are arranged between the second transmission waveguides 18 and the cutter head 6, and each following support mechanism 20 comprises a guide rail 21, a sliding block 22, a support rod 23 and a roller 24; each guide rail 21 is fixedly mounted on the cutter header 6, each sliding block 22 is arranged on the corresponding guide rail 21, each sliding block 22 has a linear movement degree of freedom relative to the corresponding guide rail 21, and a restoring spring is arranged between each sliding block 22 and the corresponding guide rail 21; each sliding block 22 is fixedly connected with the corresponding second transmission waveguide 18; and one end of each support rod 23 is fixedly connected to the corresponding sliding block 22, each roller 24 is mounted at another end of the corresponding support rod 23, and each roller 24 is in contact cooperation with the surface of the rock sample 9.

The TBM tunneling test bench for microwave-assisted rotary rock breaking provided by the invention can achieve the following research content: 1) setting different hobbing cutter spacings to study the effect of microwave irradiation on the rock breaking effect of the hobbing cutter of the TBM under different hobbing cutter spacings; 2) setting different microwave heater positions, so that the microwave heater positions can be set on the cutting trajectories of the hobbing cutter, or the microwave heaters can be positioned at the middle of the cutting trajectories of the hobbing cutter to study the effect of the microwave heaters on the rock breaking effect of the hobbing cutter of the TBM due to the different positions; 3) setting different microwave irradiation parameters and the same cutting force to study the effect of microwave irradiation on the cutting depth of the hobbing cutter of the TBM; 4) setting the different microwave irradiation parameters and the same cutting depth of the hobbing cutter to study the effect of microwave irradiation on the cutting force of the hobbing cutter of the TBM; and 5) setting different microwave irradiation parameters to study the effect of the microwave irradiation parameters on the torque of the TBM, tool life and tunneling efficiency.

In practical application of the invention, the microwave heaters 19 are preferably medium-filled horn antennas or point focus array antennas, and according to test requirements, the hobbing cutter 10 can be replaced with other types of cutting tools, such as scrapers and edge cutters. Since microwave energy can interfere with transmission of other signals, all transmission cables in the test bench of the invention use red copper shielding sleeves for microwave shielding. In order to avoid harm caused by microwave radiation to experimenters, the whole test bench needs to be placed in an electromagnetic shielding room to perform test in the state of man-and-machine separation, and besides, a monitoring system is mounted to observe the test process.

Specifically, firstly, the test bench in the vertical rock breaking simulation state is used as an example to illustrate. A prepared rock sample 9 is firstly fixedly mounted in the rock sample bearing and placing box 8. Then, a piston rod of the pushing oil cylinder 5 is controlled to retract, then the movable bracket 3 is controlled to move downwards, until the roller 24 in each following support mechanism 20 abuts against the surface of the rock sample 9 below. At the same time, the hobbing cutter 10 cuts into the surface of the rock sample 9. After each roller 24 is abutted in contact with the surface of the rock sample 9, the movable bracket 3 moves downwards. Because the rollers 24, the support rods 23, the sliding blocks 22 and the second transmission waveguides 18 are blocked by the rock sample 9 to move, the flexible waveguides 17 are bent to guarantee that downward movement of the movable bracket 3 is not subjected to interference. When the depth that the hobbing cutter 10 cuts into the surface of the rock sample 9 reaches a set value, the cutter head rotation driving motors 7 are started to drive the cutter head 6 to rotate. Besides, the microwave generator 11 is started, the microwave heater 19 is used for heating and cracking the rock sample 9. Along with the rotation of the cutter head 6, the rock sample 9 after being heated and cracked is then cut and broken by the hobbing cutter 10.

In the same way, when the test bench needs to be tested in the horizontal rock breaking simulation state, state transition needs to be performed. Specifically, it is necessary to control the piston rods of the turnover oil cylinders 4 to extend out. Further, the turnover bracket 2 is driven to rotate around a hinge shaft until the turnover bracket 2 is changed from the vertical state into the horizontal state. Then the turnover bracket 2 is fixed, and the subsequent action execution processes are the same as those of the vertical rock breaking simulation state.

The solutions in the embodiments are not intended to limit the protection scope of the patent, and all equivalent implementations or modifications that do not depart from the invention are included in the scope of this patent.

What is claimed is:

1. A TBM tunneling test bench for microwave-assisted rotary rock breaking comprising a tunneling test bench body and a microwave-assisted rock breaking system, wherein the tunneling test bench body comprises a base, a turnover bracket, a movable bracket, turnover oil cylinders, a pushing oil cylinder and a cutter head; the base is fixedly arranged on a ground, and the turnover bracket is hinged to the base, and is freely rotatable around a hinge shaft; the turnover oil cylinders are connected between the base and the turnover bracket, cylinder barrel ends of the turnover oil cylinders are hinged to the base, and piston rod ends of the turnover oil cylinders are hinged to the turnover bracket; the movable bracket coaxially sleeves the turnover bracket, and the movable bracket has an axial movement degree of freedom relative to the turnover bracket; the pushing oil cylinder is connected between the turnover bracket and the movable bracket, a cylinder barrel end of the pushing oil cylinder is hinged to the turnover bracket, and a piston rod end of the pushing oil cylinder is hinged to the movable bracket; the cutter head is located in the movable bracket, the cutter head and the movable bracket are coaxially arranged, the cutter head is connected with the movable bracket through bearings, and the cutter head has a rotation degree of freedom relative to the movable bracket; cutter head rotation driving motors are mounted in the movable bracket, and motor shafts of the cutter head rotation driving motors and the cutter head are in power transmission through gears; the microwave-assisted rock breaking system is mounted between the movable bracket and the cutter head; and a rock sample bearing and placing box is arranged on the turnover bracket on an opposite side of the cutter head, a rock sample is fixedly mounted in the rock sample bearing and placing box, and each hobbing cutter of the cutter head is right opposite to a surface of the rock sample, wherein the microwave-assisted rock breaking system comprises a microwave generator, an isolator, a tuner, a first transmission waveguide, a rotating waveguide, a power divider, two flexible waveguides, two second transmission waveguides and two microwave heaters; the rotating waveguide is mounted at a center of the cutter head, a microwave output end and a microwave input end of the rotating waveguide adopt a coaxial sleeving structure, the microwave output end of the rotating waveguide has a rotating degree of freedom relative to the microwave input end, and the microwave output end of the rotating waveguide is fixedly connected with the cutter head; the microwave generator is fixedly mounted on the movable bracket, a microwave output end of the microwave generator and the microwave input end of the rotating waveguide are connected sequentially through the isolator, the tuner and the first transmission waveguide; the isolator is used for absorbing microwave energy which is not absorbed by the rock sample and reflected backwards; the tuner is used for automatically matching and adjusting impedance, so that microwave energy generated by the microwave generator is sufficiently absorbed by the rock sample; and a microwave input end of the power divider is connected with the microwave output end of the rotating waveguide, a microwave output end of the power divider is divided into two paths for output, each path is connected with one flexible waveguide, one microwave heater is connected to the microwave output end of each flexible waveguide, and a microwave output end of each microwave heater is right opposite to the surface of the rock sample.

2. The TBM tunneling test bench for microwave-assisted rotary rock breaking according to claim 1, wherein following support mechanisms are arranged between the second transmission waveguides and the cutter head, and each following support mechanism comprises a guide rail, a sliding block, a support rod and a roller; each guide rail is fixedly mounted on the cutter header, each sliding block is arranged on the corresponding guide rail, each sliding block has a linear movement degree of freedom relative to the corresponding guide rail, and a restoring spring is arranged between each sliding block and the corresponding guide rail; each sliding block is fixedly connected with the corresponding second transmission waveguide; and one end of each support rod is fixedly connected to the corresponding sliding block, each roller is mounted at another end of the corresponding support rod, and each roller is in contact cooperation with the surface of the rock sample.

* * * * *